Figure 4:
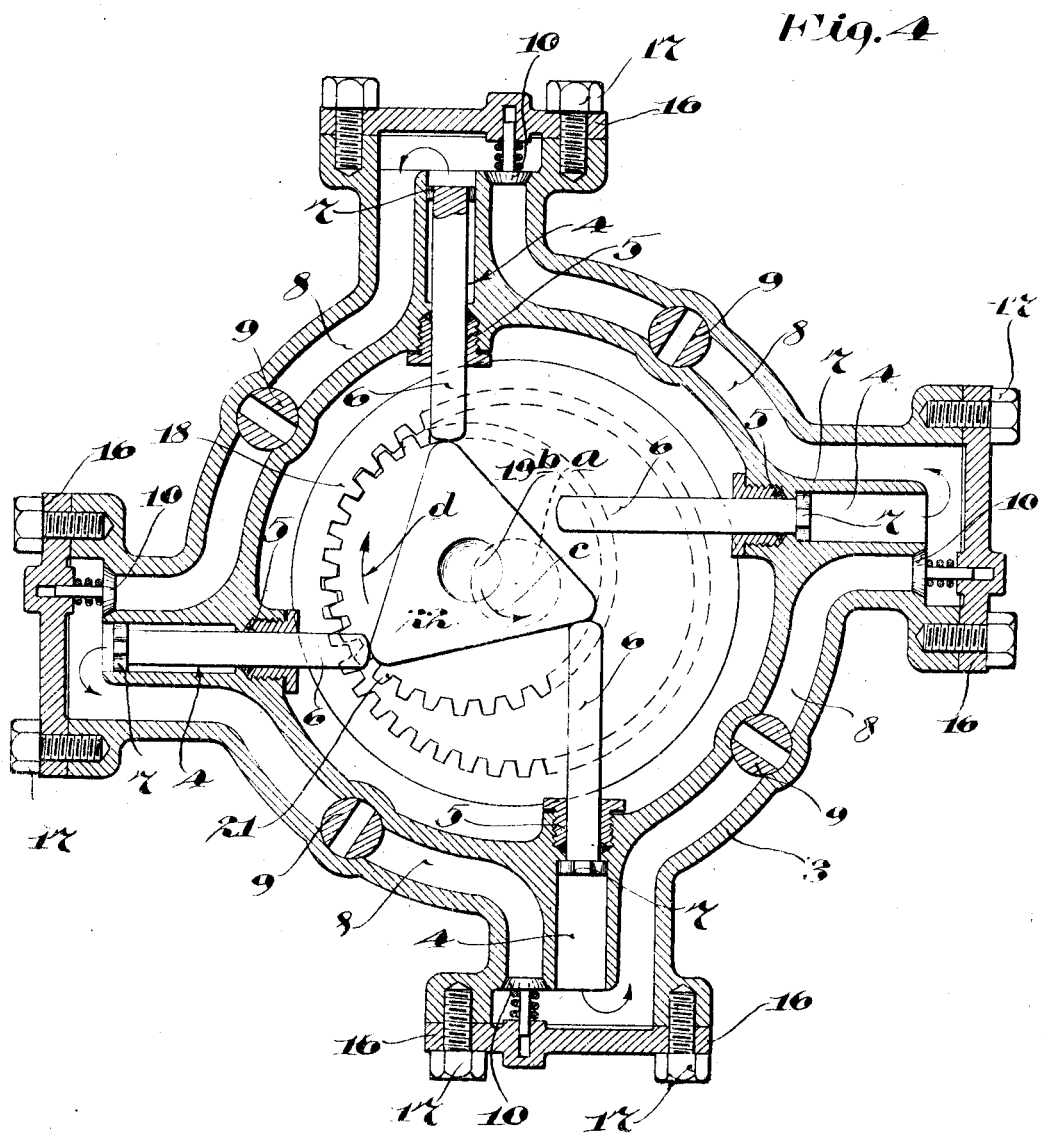

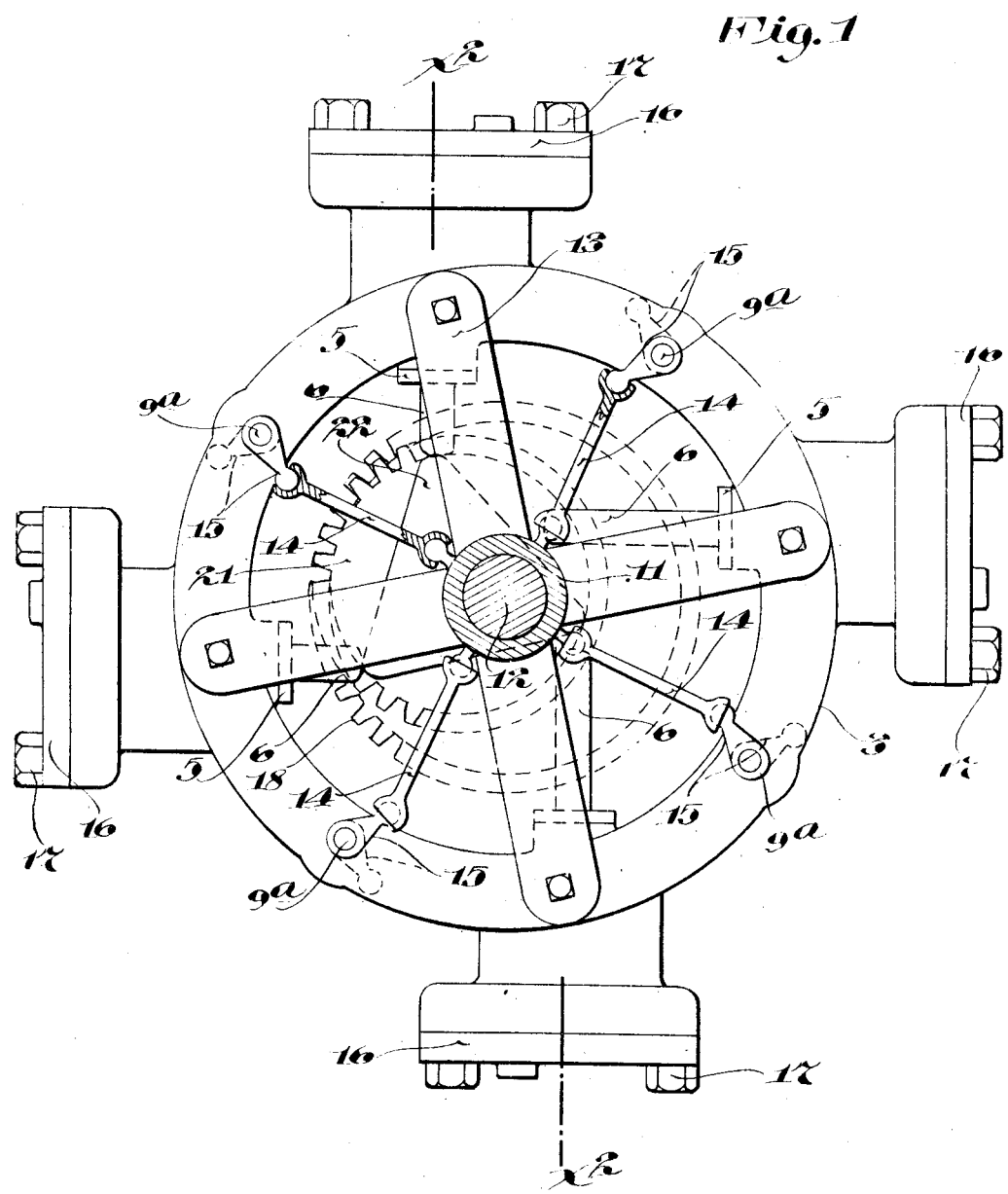

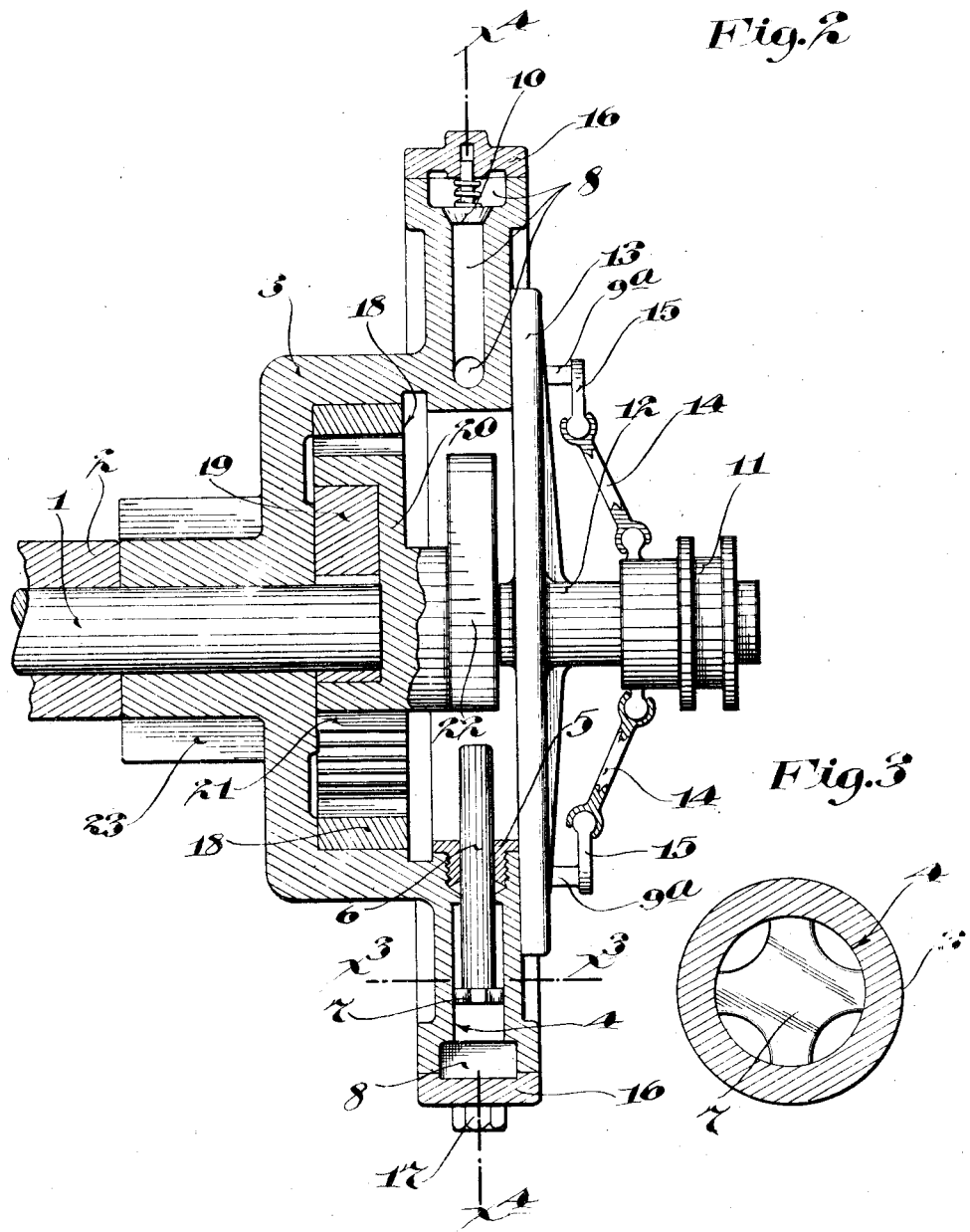

M. F. WEBSTER.
VARIABLE SPEED TRANSMISSION MECHANISM.
APPLICATION FILED FEB. 26, 1914.

1,136,188.

Patented Apr. 20, 1915.

3 SHEETS—SHEET 3.

Witnesses:
E. C. Skinkle
A. H. Opsahl

Inventor:
Melvin F. Webster
By his Attorneys

UNITED STATES PATENT OFFICE.

MELVIN F. WEBSTER, OF MINNEAPOLIS, MINNESOTA.

VARIABLE-SPEED-TRANSMISSION MECHANISM.

1,136,188.  Specification of Letters Patent. Patented Apr. 20, 1915.

Application filed February 26, 1914. Serial No. 821,131.

*To all whom it may concern:*

Be it known that I, MELVIN F. WEBSTER, a citizen of the United States, residing at Minneapolis, in the county of Hennepin and State of Minnesota, have invented certain new and useful Improvements in Variable-Speed-Transmission Mechanism; and I do hereby declare the following to be a full, clear, and exact description of the invention, such as will enable others skilled in the art to which it appertains to make and use the same.

My invention has for its object to provide a simple and highly efficient variable speed transmission mechanism adapted for use in connection with automobiles or other machines wherein it is desired to impart variable speed to an element or member that is driven from a constantly running shaft or driving element.

Generally stated, the invention consists of the novel devices and combinations of devices hereinafter described and defined in the claims.

My invention contemplates the use of a multiplicity of cylinders and pistons and coöperating means for successively and progressively operating the pistons, the said cylinders being connected in an endless series by a circulating conduit containing oil or other suitable fluid. In the oil conduit between the connected cylinders are check valves which cause the oil to flow from one cylinder to another in a constant direction, and in the said conduits between said cylinders are also choke valves, so-called, by means of which the circulation of the oil may be more or less restricted or entirely cut off. Preferably, the pistons are progressively operated by tappets, or projections, or a cam head that is connected to the casting or element containing the cylinders and connecting conduit, through an external gear on the said cam head that meshes with an internal gear on the said casting. When the choke valves are closed to cut off circulation of the oil in the circulating conduit, the pistons cannot move; and the arrangement is such that when the pistons cannot move, they will be locked to the cam head, and the casting under such conditions will be caused to rotate with the cam head.

The accompanying drawings illustrate the improved transmission mechanism in a form that I have found to be operative in actual practice.

Referring to the drawings, wherein like characters indicate like parts throughout the several views: Figure 1 is a side elevation with some parts broken away, and some parts sectioned, showing the improved transmission mechanism; Fig. 2 is a section taken approximately on the irregular line $x^2$ $x^2$ on Fig. 1, some parts being shown in full; Fig. 3 is a detail in section on the line $x^3$ $x^3$ on Fig. 2; and Fig. 4 is a section taken approximately on the line $x^4$ $x^4$ on Fig. 2.

The numeral 1 indicates a shaft which may be assumed to be a constantly driving member and which should be mounted in fixed bearings, one of which is shown in part in Fig. 2 and is designated by the numeral 2.

The numeral 3 indicates a rotary cylinder bearing casting or head, the hub of which is shown as journaled on one end of the driving shaft 1. This casting 3 is formed with a plurality of small cylinders 4, the axes of which are tangential to a circle struck from the axis of its hub.

In Fig. 4, the common axis of the shaft 1 and of the hub of the casting 3 is indicated at $a$. Working within the cylinders 4 and through stuffing boxes 5 applied to the inner extremities thereof, are pistons 6 of very simple form being, as shown, made of straight cylinder steel rods. The inner ends of the pistons 6 are shown as provided with peripherally notched heads 7 that engage shoulders in the coöperating cylinders and limit the inward movements of the piston. Inward movements of the pistons are here treated as the movements which carry the same inward toward or near the axis $a$. The outer extremities of the several cylinders 4 open into an endless oil circulating conduit 8 that connects all of the cylinders in a circuit. As shown, there are four cylinders and four coöperating pistons. In the circulating conduit 8, between each cylinder is a choke valve 9 and a yieldingly closed check valve 10. The check valves 10 permit circulation of the oil in the conduit 8 only in the direction of the arrows marked thereon on Fig. 4. The choke valves 9 are preferably arranged to be simultaneously operated either while the cylinder casting 3 is stationary or when it is being rotated; and, as shown, this is accomplished by means of a sliding sleeve 11 mounted on the hub 12 of a disk-like face plate 13 which is secured to the otherwise open side of the cylinder casting, and which sleeve is connected by links 14 to short arms 15 on the ends of the outwardly projecting stems 9ª of the said choke valves 8. The valve operating sleeve 11 is grooved for the application of one end of a projection of an ordinary shipper lever, not shown.

The cylinder casting 3, outward of the open ends of the cylinders 4 is, as shown, formed with detachable plates 16 rigidly secured in position with liquid tight joints by machine screws, or otherwise. The entire circulating conduit 8 and outer end portions of the cylinders 4 should be filled with oil or other suitable liquid. The cylinder casting 3, inward of the cylinders 4 and circulating conduit 8, and preferably laterally offset therefrom, is formed with an eccentric cavity in which is rigidly secured an internal spur gear 18. This spur gear 18 has its axis concentric to the axis $a$ of the shaft 3. Keyed, or otherwise rigidly secured to that end of the shaft 1 that projects into the cylinder casting 3 is an eccentric 19, the center of which is eccentric to the shaft axis $a$ and is at a point marked $b$ on Fig. 4. Loosely journaled on the eccentric 19 is a cam head 20 that is provided with a spur gear 21 and a three-point cam or tappet acting portion 22. The gear 21 meshes with the internal gear 18 and the three-point cam or tappet portion 22 is offset therefrom and located in the plane of the piston 6 with its points arranged to progressively and successively engage the inner ends of the said pistons.

With the arrangement shown, wherein there are four pistons and three piston engaging projections on the tappet 22, the relation of the internal gear 18 to the external gear 21 should be in the ratio of four to three. For example, if the internal gear has forty-four teeth, then the external gear should have thirty-three teeth.

The hub of the cylinder casting 3 is provided with a gear 23 for transmitting motion from the cylinder casting to some other driven part; but this gear 23 is only one of the three different devices that may be used for this purpose. The shaft 1 is the driving member and the cylinder casting 3 the driven member of the transmission mechanism proper.

With the parts arranged as described, the operation of the transmission mechanism is substantially as follows: First, assume that the shaft 1 is continuously and constantly driven, in the direction of the arrow marked $c$ on Fig. 4. If now, the choke valves 9 are all closed so that there can be no circulation of the oil in the conduit 8, all of the pistons will be locked against outward movement and the tappet 22 and gear 21 will be locked to the gear 18 and cylinder casting, so that the said cylinder casting will then be caused to rotate with the driving shaft 1 just as if it were keyed thereto. When however, the choke valves 9 are moved into open positions, they permit a circulation of the oil from one cylinder to the other through the conduit 8 in the direction of the arrows in Fig. 4, already noted. When this circulation of the oil is permitted in the said conduits, the speed under which the pistons can be forced outward under a given driving power, will depend on the extent to which the said choke valves are opened. Assuming that the valves 9 are in open positions and that the driving shaft 1 and eccentric 19 are rotated in the direction of the arrow marked $c$ on Fig. 4, the internal gear 18 and casing 3 will be rotated in the same direction, but at a slower speed, because the gear 21 and cam 22 will then have a lagging or retarded rotation around the axis of said eccentric 19 in the direction of the arrow marked $d$ on Fig. 4. Under this rotation, the three points of the tappet 22 will progressively and successively engage the inner ends of the pistons 6 and force the same outward. If the choke valves 9 be wide open, the oil may be very freely circulated from one cylinder to the other in the conduit 8, the only resistance being the friction of the wall of the conduit with the oil, which is negligible, and the slight force required to open the check valves 10. Hence, under such wide open adjustments of the choke valves, the oil will be circulated so freely that the gear 21 will simply run loose within the gear 18 and the cylinder casting will stand still, if in fact, any considerable resistance to its movement is offered.

As the choke valves 9 are moved from open toward closed positions, the resistance to the circulation of the oil increases and the cylinder casting and its gear 18 commence to rotate, and the speed of rotation progressively increases under closing movements of said choke valves until they partake of the common rotation of said driving shaft. Hence, by the proper adjustments of the said choke valves, the cylinder casting can be caused to rotate at any desired rate of speed from the constantly running shaft. Obviously, the pistons will be given their inward movements by the pressure of oil delivered against the outer ends thereof, by the pressure of the oil in the respective cylinders.

In the specification and in certain of the claims, the shaft is treated as the driving member and the cylinder casting as the driven member of the variable speed transmission mechanism, but it will be understood that the relation of the said parts may be reversed, that is, the cylinder casting may be the driving member and the shaft the driven member. Otherwise stated, it will be within the scope of this invention, as herein disclosed and claimed, to primarily apply the driving power either to the shaft or to the so-called cylinder casting.

What I claim is:

1. In a variable speed transmission mechanism, the combination with a shaft provided with a driving eccentric, a piston support carrying a plurality of circumferentially spaced pistons, and provided with chambers within which said pistons are movable, the said chambers being connected in an endless series, and a cam carried by said eccentric and rotatably driven with a timed action from said piston support and eccentric and operative, progressively, and successively on said pistons.

2. In a variable speed transmission mechanism, the combination with a shaft provided with a driving eccentric, of a cylinder casting having its axis of rotation concentric to the axis of said driving shaft but capable of rotation independent thereof, said cylinder casting having a multiplicity of cylinders and a circulating conduit connecting said cylinders in an endless series, pistons working in said cylinders, an internal gear carried by said cylinder casting, a spur gear journaled on and carried by the driving eccentric of said driving shaft and provided with a tappet having a multiplicity of points arranged to progressively and successively engage the inner ends of said pistons and force the same outward, and a choke valve in said circulating conduit for cutting off or affording a variable resistance to the circulation of liquid therethrough.

3. In a variable speed transmission mechanism, the combination with a shaft provided with a driving eccentric, of a cylinder casting having its axis of rotation concentric to the axis of said driving shaft, but capable of rotation independent thereof, said cylinder casting having a multiplicity of cylinders and a circulating conduit connecting said cylinders in an endless series, pistons working in said cylinders, an internal gear carried by said cylinder casting, a spur gear journaled on and carried by the driving eccentric of said driving shaft and provided with a tappet having a multiplicity of points arranged to progressively and successively engage the inner ends of said pistons and force the same outward, and check valves and choke valves in said circulating conduit between said pistons.

4. In a variable speed transmission mechanism, the combination with a shaft provided with a driving eccentric, of a cylinder casting having its axis of rotation concentric to the axis of said driving shaft, but capable of rotation independent thereof, said cylinder casting having a multiplicity of cylinders and a circulating conduit connecting said cylinders in an endless series, pistons working in said cylinders, an internal gear carried by said cylinder casting, a spur gear journaled on and carried by the driving eccentric of said driving shaft and provided with a tappet having a multiplicity of points arranged to progressively and successively engage the inner ends of said pistons and force the same outward, check valves and choke valves in said circulating conduit between said pistons, and a valve actuating device arranged to impart simultaneous and like adjustments to said choke valves.

5. The combination with a shaft and a cylinder casting loosely journaled thereon, said cylinder casting having a multiplicity of cylinders and a circulating conduit connecting the same, of pistons working in said cylinders with their ends projecting inward, check valves and choke valves in said conduit between said cylinders, an internal gear carried by said cylinder casting, a driving eccentric carried by said shaft, and an external spur gear carried by and loosely journaled on said driving eccentric and having a tappet head provided with a multiplicity of points operative progressively and successively on the inner ends of said pistons, the number of operating points of said tappet being less than the number of said pistons, and the teeth of said internal gear being the same numerical ratio to the teeth of said external gear, that the number of pistons bear to the number of points of said tappet.

In testimony whereof I affix my signature in presence of two witnesses.

MELVIN F. WEBSTER.

Witnesses:
 HARRY D. KILGORE,
 F. D. MERCHANT.